(12) United States Patent  
Hasegawa et al.

(10) Patent No.: US 9,853,522 B2  
(45) Date of Patent: Dec. 26, 2017

(54) ELECTRICAL ROTATING MACHINE HAVING A COOLING FAN AND EXHAUST PORTS

(71) Applicant: Mitsubishi Electric Corporation, Chiyoda-ku, Tokyo (JP)

(72) Inventors: Kazuya Hasegawa, Chiyoda-ku (JP); Kazunori Tanaka, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 14/284,942

(22) Filed: May 22, 2014

(65) Prior Publication Data

US 2014/0354092 A1 Dec. 4, 2014

(30) Foreign Application Priority Data

Jun. 4, 2013 (JP) ................................. 2013-117609

(51) Int. Cl.
*H02K 9/06* (2006.01)
*H02K 5/20* (2006.01)

(52) U.S. Cl.
CPC ................. *H02K 9/06* (2013.01); *H02K 5/20* (2013.01); *H02K 2205/09* (2013.01)

(58) Field of Classification Search
CPC ............. H02K 5/20; H02K 5/225; H02K 9/06
USPC ..................... 310/63, 71, 68 D, 89
See application file for complete search history.

(56) References Cited

U.S. PATENT DOCUMENTS

| 4,464,594 A | * | 8/1984 | Matsumoto | H02K 9/06 310/51 |
| 4,476,405 A | * | 10/1984 | Komurasaki | H02K 9/06 310/60 R |
| 4,488,070 A | * | 12/1984 | Iwaki | H02K 9/06 310/62 |
| 4,757,221 A | * | 7/1988 | Kurihashi et al. | 310/62 |

(Continued)

FOREIGN PATENT DOCUMENTS

| DE | 102006052113 A1 | 5/2008 |
| EP | 2264868 A2 | 12/2010 |

(Continued)

OTHER PUBLICATIONS

Communication dated Oct. 1, 2014, from the European Patent Office in counterpart European Application No. 14169463.8.

(Continued)

*Primary Examiner* — Bernard Rojas
*Assistant Examiner* — Rashad Johnson
(74) *Attorney, Agent, or Firm* — Sughrue Mion, PLLC; Richard C. Turner (57) ABSTRACT

A cooling fan is provided at an axial end portion of a rotor. The cooling fan generates a cooling air when rotated integrally with the rotor. On a stator core arranged at a position on a radially outer side of the rotor, a plurality of stator coils are arrayed in a circumferential direction of the stator core. Each stator coil includes a coil end that protrudes from an axial end surface of the stator core. A front housing covering the cooling fan includes: an exhaust port for passing the cooling air therethrough, at least part of the exhaust port being located at a position on a radially outer side of the coil end; and a recess portion opposed to the coil end in an axial direction.

8 Claims, 4 Drawing Sheets

(56) References Cited

U.S. PATENT DOCUMENTS

| | | | | |
|---|---|---|---|---|
| 5,751,079 | A * | 5/1998 | Bagherpour | H02K 5/20 310/59 |
| 6,888,275 | B2 * | 5/2005 | Nakano | F04D 29/4213 310/58 |
| 7,969,051 | B2 * | 6/2011 | Vasilescu et al. | 310/62 |
| 8,097,994 | B2 * | 1/2012 | Ito | H02K 9/06 310/156.66 |
| 8,294,309 | B2 * | 10/2012 | Izumi et al. | 310/60 R |
| 2004/0222710 | A1 * | 11/2004 | Kashihara | H02K 1/16 310/43 |
| 2007/0252488 | A1 | 11/2007 | Kusase et al. | |
| 2008/0061639 | A1 * | 3/2008 | Koike | H02K 9/06 310/63 |
| 2010/0141065 | A1 * | 6/2010 | El Baraka et al. | 310/71 |
| 2010/0289351 | A1 * | 11/2010 | Maeda | H02K 11/046 310/64 |
| 2010/0301692 | A1 * | 12/2010 | Shirakata | H02K 5/225 310/89 |
| 2011/0018375 | A1 * | 1/2011 | Kimura | H02K 3/528 310/71 |
| 2012/0104887 | A1 * | 5/2012 | Tanaka | H02K 5/08 310/88 |
| 2012/0181903 | A1 * | 7/2012 | Kato | H02K 11/048 310/67 R |
| 2012/0212096 | A1 * | 8/2012 | Minami | H02K 21/044 310/181 |
| 2014/0225461 | A1 * | 8/2014 | Ohashi | H02K 5/04 310/43 |
| 2015/0076945 | A1 * | 3/2015 | Kudou | H02K 3/28 310/71 |
| 2015/0194861 | A1 * | 7/2015 | Fakes | H02K 5/20 310/59 |
| 2016/0134164 | A1 * | 5/2016 | Margueritte | H02K 3/18 310/71 |
| 2016/0172911 | A1 * | 6/2016 | Yoshizawa | H02K 3/325 310/215 |

FOREIGN PATENT DOCUMENTS

| | | |
|---|---|---|
| JP | 47-49122 A | 12/1972 |
| JP | 55-79659 A | 11/1980 |
| JP | 2001238402 A | 8/2001 |
| JP | 3561927 A | 9/2004 |
| JP | 200872792 A | 3/2008 |

OTHER PUBLICATIONS

Communication dated Jul. 29, 2014 from the Japanese Patent Office in counterpart application No. 2013-117609.

Communication dated Jan. 5, 2016, from the Japanese Patent Office in counterpart application No. 2015-091054.

* cited by examiner

ELECTRICAL ROTATING MACHINE HAVING A COOLING FAN AND EXHAUST PORTS

TECHNICAL FIELD

The present invention relates to a rotating electrical machine including a cooling fan to be rotated integrally with a rotor.

BACKGROUND ART

There has hitherto been known a vehicle AC power generator configured to generate a cooling air by a cooling fan rotated integrally with a rotor in order to cool coil ends of a plurality of stator coils arranged on a radially outer side of the rotor. In such related-art vehicle AC power generator, the following structure has been proposed in order to improve cooling performance on the coil ends by the cooling air from the cooling fan. That is, the coil ends of adjacent stator coils have different lengths so as to form a step between the coil ends, to thereby increase a contact area of the coil end with the cooling air (see, for example, Patent Literature 1).

PRIOR ART LITERATURES

Patent Literatures

[PTL 1] JP 3561927 B

SUMMARY OF THE INVENTION

Problems to be Solved by the Invention

In the above-mentioned related-art vehicle AC power generator, however, it is necessary to vary the lengths of the coil ends of the stator coils, and hence the work of winding the stator coils becomes complicated to reduce productivity.

Further, the lengths of the coil ends are increased in some of the stator coils, and hence a clearance between a housing covering the coil end and the coil end is narrowed in part to reduce the volume of cooling air passing through the clearance between the coil end and the housing. Accordingly, there is a fear in that cooling performance on the coil end may be reduced.

In addition, the step is formed between the coil ends, and hence a cross-sectional area of a flow path for the cooling air greatly differs depending on locations, and a fluid pressure greatly fluctuates. Accordingly, there is a fear in that fan noise from the cooling fan may be increased at a specific order.

The present invention has been made in view of the above-mentioned problems, and it is an object thereof to provide a rotating electrical machine capable of avoiding reduction in productivity and increase in fan noise and improving cooling performance.

Means for Solving the Problems

According to one embodiment of the present invention, there is provided a rotating electrical machine, including: a rotor to be rotated about its axis; a stator including: an annular stator core arranged on a radially outer side of the rotor; and a plurality of stator coils provided onto the annular stator core and arrayed in a circumferential direction of the annular stator core; a housing for supporting the rotor and the stator; and a cooling fan provided at an axial end portion of the rotor and covered by the housing, for generating a cooling air when rotated integrally with the rotor, in which each of the plurality of stator coils includes a coil end that protrudes from an axial end surface of the annular stator core, and in which the housing includes: an exhaust port for passing the cooling air therethrough, at least part of the exhaust port being located at a position on a radially outer side of the coil end; and a recess portion opposed to the coil end in an axial direction.

Effects of the Invention

According to the rotating electrical machine of one embodiment of the present invention, the recess portion opposed to the coil end of the stator coil in the axial direction is formed in the housing, and hence the width of a flow path for the cooling air, which is formed between the coil end and the housing, can be enlarged, thereby being capable of improving the cooling performance. Besides, it is unnecessary to provide a step between the coil ends because the width of the flow path for the cooling air is enlarged, and hence the coil ends can be formed to have the same length. Consequently, the reduction in productivity and the increase in fan noise can be avoided.

MODES FOR CARRYING OUT THE INVENTION

First Embodiment

Figure 1:
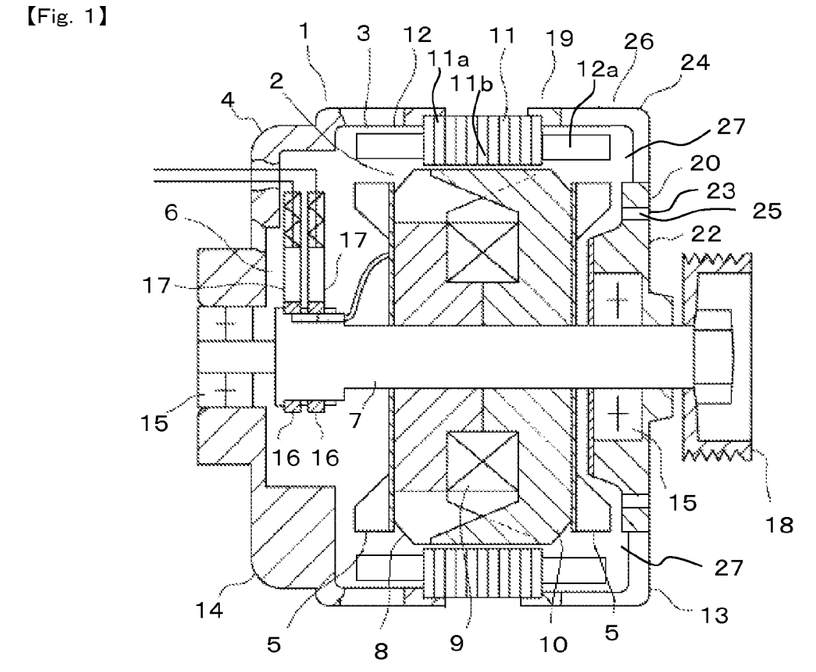
FIG. 1 is a cross-sectional view illustrating a vehicle AC power generator according to a first embodiment of the present invention.

FIG. 1 is a cross-sectional view illustrating a vehicle AC power generator according to a first embodiment of the present invention. Referring to FIG. 1, a vehicle AC power generator (rotating electrical machine) 1 includes a rotor 2, a cylindrical stator 3, a housing 4, cooling fans 5, and a brush device 6. The rotor 2 is rotated about its axis. The stator 3 is arranged at a position on a radially outer side of the rotor 2 to surround an outer periphery of the rotor 2. The housing 4 supports the rotor 2 and the stator 3. The cooling fans 5 are provided on the rotor 2 to generate a cooling air when rotated integrally with the rotor 2. The brush device 6 is provided in the housing 4 to supply power to the rotor 2.

The rotor 2 includes a rotary shaft 7 and a rotor main body 8. The rotary shaft 7 is arranged on the axis of the rotor 2. The rotor main body 8 is provided to the rotary shaft 7 and housed in the housing 4. The rotor main body 8 includes a field coil 9 and a pole core 10. The field coil 9 generates a magnetic flux when supplied with power from the brush device 6. The pole core 10 is provided with the field coil 9, and a magnetic pole is formed thereto by the magnetic flux generated by the field coil 9.

The stator 3 is fixed in the housing 4. Further, the stator 3 includes a cylindrical (annular) stator core 11 and a plurality of stator coils 12. The stator core 11 surrounds the rotor main body 8. The plurality of stator coils 12 are provided onto the stator core 11, and generate an AC electromotive force when the magnetic flux generated from the field coil 9 changes along with the rotation of the rotor 2. Note that, although not illustrated, a rectifier for rectifying an AC current generated in the stator 3 into a DC current, a voltage regulator for regulating the magnitude of an AC voltage generated in the stator 3, and the like are provided in the housing 4.

The stator core 11 includes a magnetic member (such as iron). In this example, the stator core 11 includes a plurality of magnetic members stacked in the axial direction of the rotor 2. The stator core 11 includes an annular back yoke section 11a and a plurality of magnetic pole tooth sections 11b. The plurality of magnetic pole tooth sections 11b each protrude from the back yoke section 11a toward a radially inner side, and are arranged at intervals in a circumferential direction of the stator core 11. The magnetic pole tooth sections 11b are equiangularly arranged on the stator core 11.

The stator coils 12 are provided in the respective magnetic pole tooth sections 11b. Further, the plurality of stator coils 12 are arrayed in the circumferential direction of the stator core 11. In this example, each stator coil 12 is provided to straddle the plurality of magnetic pole tooth sections 11b, and hence the stator coils 12 adjacent in the circumferential direction are arranged to partially overlap each other in the radial direction. Each stator coil 12 includes a coil end 12a that protrudes from an end surface of the stator core 11 (axial end surface of the stator core 11) in the axial direction of the rotor 2.

An apex of each coil end 12a reaches a position on a radially outer side of the cooling fan 5. The coil ends 12a all have the same length (axial dimension of each coil end 12a). With this, the positions of the apexes of the coil ends 12a with respect to the axial end surface of the stator core 11 are all the same in the axial direction of the rotor 2. In other words, the stator coils 12 are arrayed in the circumferential direction of the stator core 11 in a state in which the apexes of the coil ends 12a are not shifted from one another in the axial direction of the rotor 2 (that is, in a state in which no step is formed between the apexes of the coil ends 12a in the axial direction of the rotor 2).

The housing 4 includes a front housing 13 and a rear housing 14, each of which is made of aluminum and formed into a substantially bowl shape. The front housing 13 and the rear housing 14 are fixed to each other by a plurality of bolts (not shown) in a state in which opening portions thereof are opposed to each other. Each of the front housing 13 and the rear housing 14 is opposed to the rotor 2 and the stator 3 in the axial direction of the rotor 2. In this example, each of the front housing 13 and the rear housing 14 is molded by sand casting, aluminum die-casting, or the like.

The rotary shaft 7 passes through the center of each of the front housing 13 and the rear housing 14. Further, the rotary shaft 7 is rotatably supported by each of the front housing 13 and the rear housing 14 through intermediation of a bearing 15.

The cooling fans 5 are fixed to both axial end surfaces of the rotor main body 8, respectively. Thus, the cooling fan 5 fixed to one end surface of the rotor main body 8 is covered by the front housing 13, and the cooling fan 5 fixed to the other end surface of the rotor main body 8 is covered by the rear housing 14. Further, the cooling fans 5 each include a plurality of blades 5a arranged at intervals in a rotational direction of the cooling fan 5. Each blade 5a is arranged at an outer peripheral portion of the cooling fan 5.

The brush device 6 includes a pair of slip rings 16 and a pair of brushes 17. The pair of slip rings 16 is fixed at a rear portion of the rotary shaft 7. The pair of brushes 17 is provided in the housing 4 and brought into contact with the corresponding slip ring 16 individually. When the rotary shaft 7 is rotating, each slip ring 16 rotates about the axis of the rotary shaft 7 while sliding on each brush 17.

Note that, a pulley 18 around which a transmission belt (not shown) for transmitting power is wound is fixed at an end portion of the rotary shaft 7 that protrudes from the front housing 13 to the outside of the housing 4.

Figure 2:
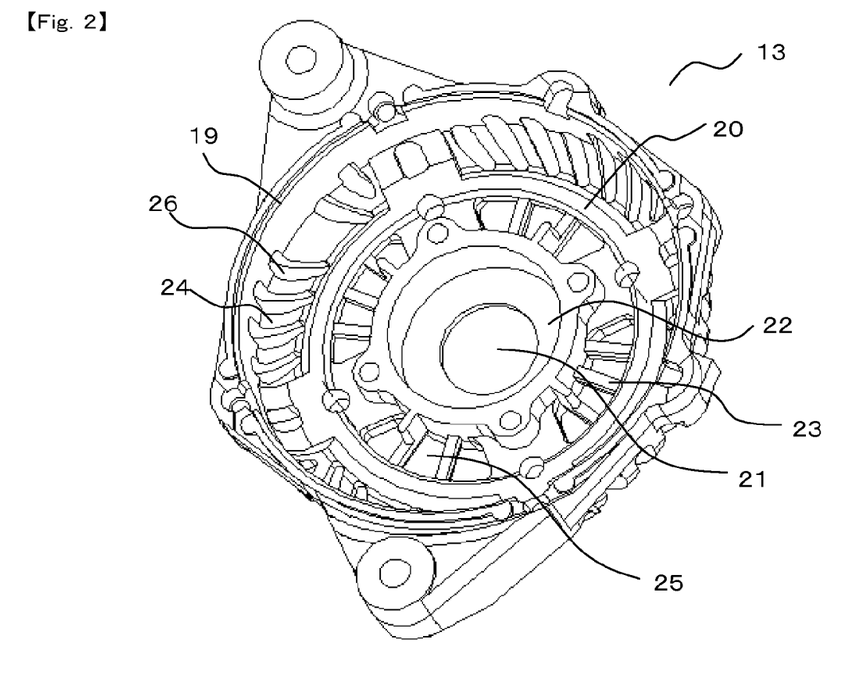
FIG. 2 is a perspective view illustrating a front housing as viewed from inside a housing of FIG. 1.
Figure 3:
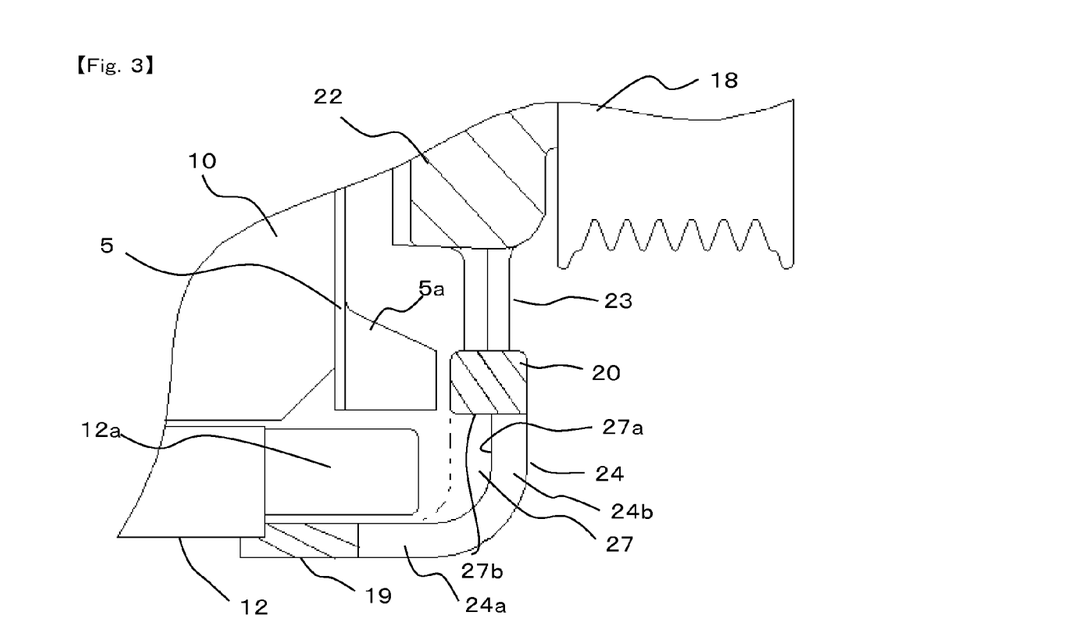
FIG. 3 is a schematic cross-sectional view illustrating main portions of a cooling fan and the front housing of FIG. 1.

FIG. 2 is a perspective view illustrating the front housing 13 as viewed from inside the housing 4 of FIG. 1. Further, FIG. 3 is a schematic cross-sectional view illustrating main portions of the cooling fan 5 and the front housing 13 of FIG. 1. Referring to FIGS. 2 and 3, the front housing 13 includes an annular outer frame portion 19, an annular intermediate frame portion 20, a boss section 22, a plurality of spokes 23, and a plurality of ribs 24. The outer frame portion 19 is arranged coaxially with the rotor 2. The intermediate frame portion 20 is arranged coaxially with the outer frame portion 19 at a position farther away from the rotor main body 8 with respect to the outer frame portion 19 in the axial direction of the rotor 2. The boss section 22 has a through hole 21 formed therein for inserting the rotary shaft 7 therethrough, and is arranged at a position on an inner side of the intermediate frame portion 20. The plurality of spokes 23 are connected between the intermediate frame portion 20 and the boss section 22. The plurality of ribs 24 are connected between the outer frame portion 19 and the intermediate frame portion 20. A step portion for fitting the stator core 11 therein is formed at an inner peripheral portion of the outer frame portion 19.

Each spoke 23 is arranged at a position opposed to the rotor main body 8 in the axial direction of the rotor 2. Further, the spokes 23 are arranged along a radial direction of the front housing 13 at intervals in a circumferential direction of the front housing 13. With this, a plurality of intake ports 25 partitioned by the spokes 23 are formed at positions in the front housing 13 between the intermediate frame portion 20 and the boss section 22.

Each rib 24 is arranged at a position on a radially outer side of the cooling fan 5. Further, the ribs 24 are arranged at intervals in the circumferential direction of the front housing 13. With this, a plurality of exhaust ports 26 partitioned by the ribs 24 are formed at positions in the front housing 13 between the outer frame portion 19 and the intermediate frame portion 20.

In this example, each rib 24 includes a rib axial end 24a and a rib radial end 24b. The rib axial end 24a is arranged at a position on a radially outer side of the coil end 12a and extends along the coil end 12a from the outer frame portion 19. The rib radial end 24b extends on an axially outer side of the coil end 12a to reach the intermediate frame portion 20 while being curved from an end portion of the rib axial end 24a. With this, each exhaust port 26 is formed as a slit-shaped hole that extends from the position on the radially outer side of the coil end 12a to reach a position closer to the rotary shaft 7 with respect to the coil end 12a.

A clearance between a surface of the front housing 13 opposed to the blade 5a of the cooling fan 5 (fan opposed surface) and the blade 5a of the cooling fan 5 is narrower than a clearance between another portion of the cooling fan 5 and the front housing 13 in order to secure a flow rate of the cooling air generated by the rotation of the cooling fan 5. In this example, as illustrated in FIG. 3, the intermediate frame portion 20 is opposed to the blade 5a of the cooling fan 5 in the axial direction of the rotor 2.

The cooling air generated by the rotation of the cooling fan 5 is sent from the outside of the housing 4 to the inside of the housing 4 through each intake port 25. The cooling air sent to the inside of the housing 4 through each intake port 25 flows in the housing 4 toward a radially outer side of the front housing 13, and passes through a flow path formed between the coil end 12a and the front housing 13. After that, the cooling air is exhausted to the outside of the housing 4 through each exhaust port 26. The cooling air undergoes heat exchange with the coil end 12a when passing through the flow path between the coil end 12a and the front housing 13. The coil end 12a is cooled by the heat exchange with the cooling air.

The rib radial end 24b of each rib 24 has a recess portion 27 formed therein, which is opposed to the coil end 12a in the axial direction of the rotor 2. The rib radial end 24b has a thickness smaller than that of the intermediate frame portion 20 because the recess portion 27 is formed therein.

The recess portion 27 is formed in the rib radial end 24b while avoiding a portion of the front housing 13 opposed to the blade 5a of the cooling fan 5. Thus, in this example, the recess portion is formed in the rib radial end 24b while avoiding the intermediate frame portion 20. An inner surface of the recess portion 27 includes a coil end opposed surface 27a and a recess portion side surface 27b. The coil end opposed surface 27a is opposed to the coil end 12a in the axial direction of the rotor 2. The recess portion side surface 27b connects the fan opposed surface of the intermediate frame portion 20 and the coil end opposed surface 27a to each other.

The recess portion side surface 27b is a surface formed along the axial direction of the rotor 2. The coil end opposed surface 27a is a surface formed at a position farther away from the cooling fan 5 and the coil end 12a with respect to the fan opposed surface of the rib radial end 24b in the axial direction of the rotor 2. With this, the width of the flow path (clearance) for the cooling air, which is formed between the coil end 12a and each rib radial end 24b, becomes larger as compared with the case where the recess portion 27 is not formed.

In the vehicle AC power generator structured as described above, because the recess portion 27 opposed to the coil end 12a in the axial direction of the rotor 2 is formed in the front housing 13, the width of the flow path for the cooling air, which is formed between the coil end 12a and the front housing 13, can be enlarged. With this, the volume of the cooling air passing through between the coil end 12a and the front housing 13 can be increased to increase the amount of heat exchange on the coil end 12a. Consequently, cooling performance on the coil end 12a can be improved.

Further, because the volume of the cooling air passing through between the coil end 12a and the front housing 13 can be increased, the cooling performance on the coil end 12a can be secured without the need to increase a contact area of the coil end 12a with the cooling air by shifting the positions of the apexes of the coil ends 12a in the axial direction of the rotor 2 (by forming a step in the axial direction of the rotor 2). Consequently, the work of winding the stator coil 12 can be avoided from being complicated, to thereby avoid reduction in productivity.

In addition, the recess portion 27 is formed while avoiding the fan opposed portion, and hence the clearance between the blade 5a of the cooling fan 5 and the front housing 13 can be prevented from being increased by the recess portion 27, to thereby secure the volume of the cooling air. Consequently, reduction in cooling performance on the coil end 12a can be prevented.

Further, because the coil ends 12a all have the same length in the axial direction of the rotor 2, the lengths of some stator coils 12 in the axial direction can be prevented from being larger to prevent an increase in copper loss of the stator coils 12. In addition, the cross-sectional area of the flow path for the cooling air, which is formed between the coil end 12a and each rib radial end 24b, can also be prevented from greatly differing depending on locations. Consequently, fluctuations in pressure of a fluid passing through the flow path can be suppressed to avoid increase in fan noise from the cooling fan 5.

Second Embodiment

In the first embodiment, the recess portion side surface 27b is a surface formed along the axial direction of the rotor 2. Alternatively, however, the recess portion side surface 27b may be a surface inclined with respect to the axial direction of the rotor 2.

Figure 4:
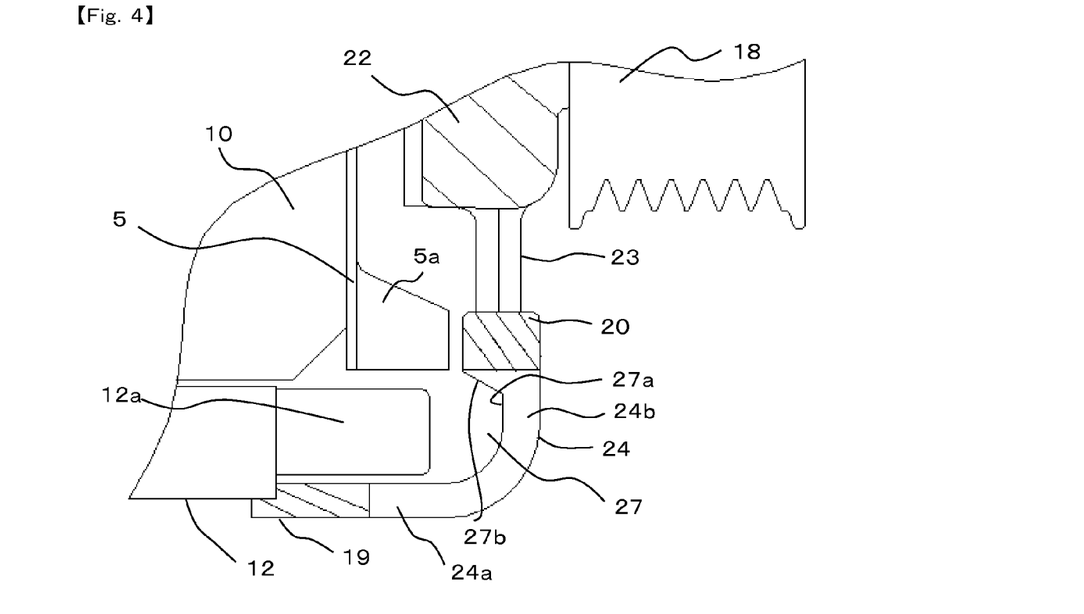
FIG. 4 is a schematic cross-sectional view illustrating a main portion of a vehicle AC power generator according to a second embodiment of the present invention.

FIG. 4 is a schematic cross-sectional view illustrating a main portion of a vehicle AC power generator according to a second embodiment of the present invention. As illustrated in FIG. 4, the recess portion side surface 27b is a flat surface inclined with respect to the axis of the rotor 2 so that a distance of the recess portion side surface 27b from the rotary shaft 7 may become continuously larger as a distance of the recess portion side surface 27b from the rotor 2 and the stator 3 in the axial direction of the rotor 2 becomes larger. Other configurations are the same as those in the first embodiment.

Even with this configuration, the same effects as those in the first embodiment can be obtained.

Third Embodiment

In the second embodiment, the recess portion side surface 27b is a surface inclined with respect to the axis of the rotor 2. Alternatively, however, the recess portion side surface 27b may be a stepped surface.

Figure 5:
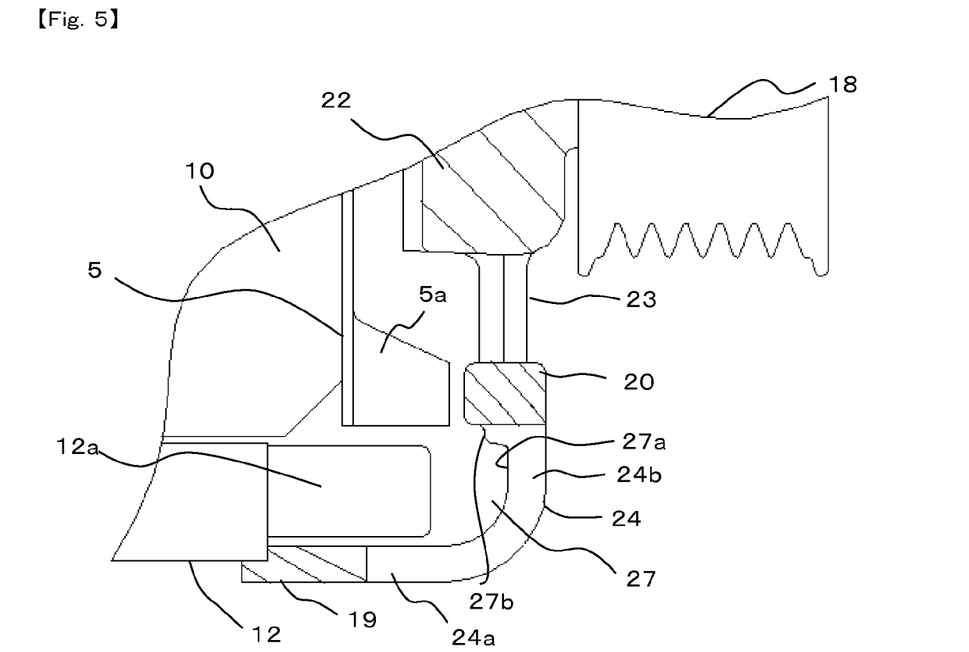
FIG. 5 is a schematic cross-sectional view illustrating a main portion of a vehicle AC power generator according to a third embodiment of the present invention.

FIG. 5 is a schematic cross-sectional view illustrating a main portion of a vehicle AC power generator according to a third embodiment of the present invention. As illustrated in FIG. 5, the recess portion side surface 27b is a stepped surface in which a first surface along the axial direction and a second surface along the radial direction are alternately and continuously formed. In this example, the recess portion side surface 27b includes two first surfaces and one second surface. A distance between the rotary shaft 7 and one of the two first surfaces of the recess portion side surface 27b closer to the rotor 2 and the stator 3 is smaller than a distance between the rotary shaft 7 and the other first surface farther away from the rotor 2 and the stator 3. Other configurations are the same as those in the first embodiment.

Even with this configuration, the same effects as those in the first embodiment can be obtained.

Fourth Embodiment

In the third embodiment, the recess portion side surface 27b is a stepped surface. Alternatively, however, the recess portion side surface 27b may be a curved surface.

Figure 6:
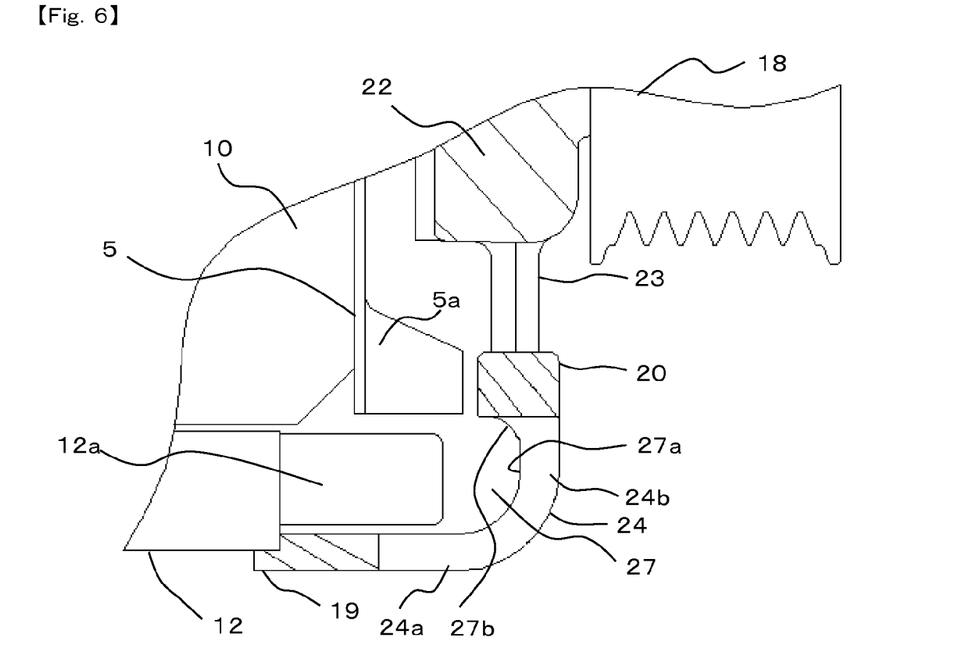
FIG. 6 is a schematic cross-sectional view illustrating a main portion of a vehicle AC power generator according to a fourth embodiment of the present invention.

FIG. 6 is a schematic cross-sectional view illustrating a main portion of a vehicle AC power generator according to a fourth embodiment of the present invention. As illustrated in FIG. 6, the recess portion side surface 27b is a curved surface formed so that a distance of the recess portion side surface 27b from the rotary shaft 7 may become continuously larger as a distance of the recess portion side surface 27b from the rotor 2 and the stator 3 in the axial direction of the rotor 2 becomes larger. In this example, the recess portion side surface 27b is a curved surface along an arc whose center point is located in the flow path between the coil end 12a and the rib radial end 24b. Other configurations are the same as those in the first embodiment.

Even with this configuration, the same effects as those in the first embodiment can be obtained.

Fifth Embodiment

The present invention is applied to the vehicle AC power generator in each of the above-mentioned embodiments, but may be applied to a generator-motor as a rotating electrical machine.

Figure 7:
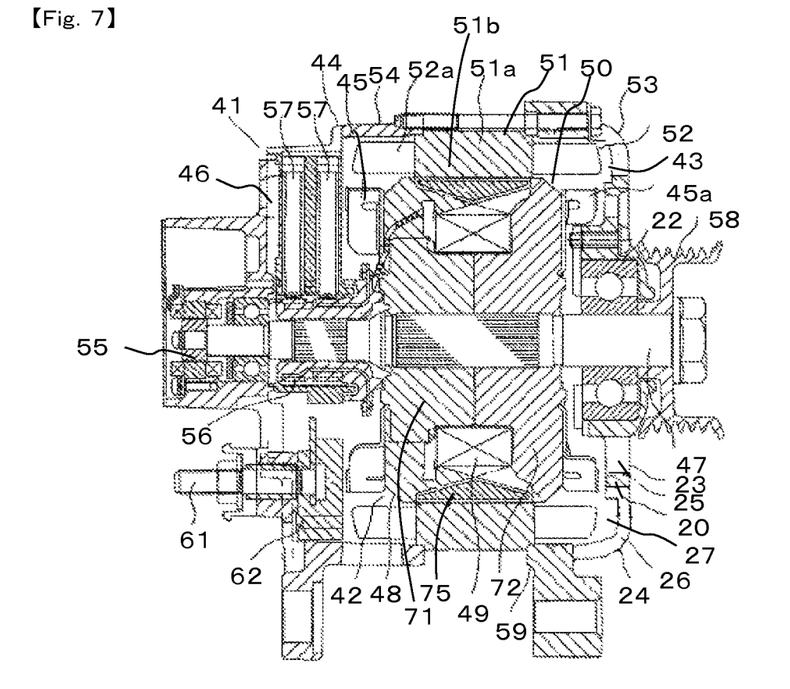
FIG. 7 is a cross-sectional view illustrating a vehicle AC generator-motor according to a fifth embodiment of the present invention.
Figure 8:
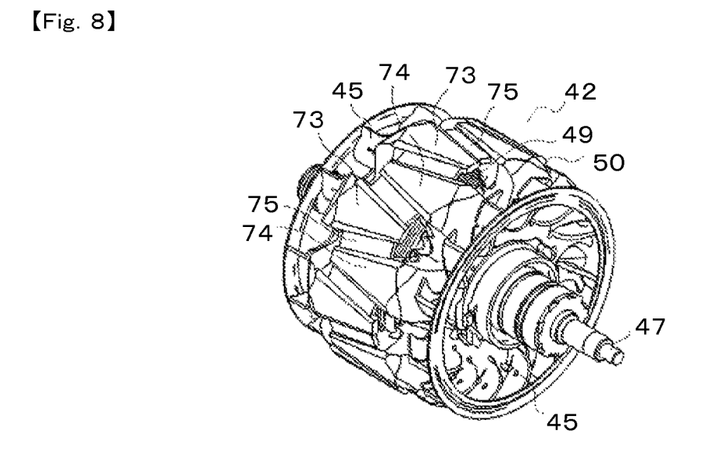
FIG. 8 is a perspective view illustrating a rotor of FIG. 7.

FIG. 7 is a cross-sectional view illustrating a vehicle AC generator-motor according to a fifth embodiment of the present invention. Further, FIG. 8 is a perspective view illustrating a rotor of FIG. 7. Referring to FIGS. 7 and 8, a vehicle AC generator-motor (rotating electrical machine) 41 includes a Lundell-type rotor 42, a cylindrical stator 43, a housing 44, cooling fans 45, and a brush device 46. The rotor 42 is rotated about its axis. The stator 43 is arranged at a position on a radially outer side of the rotor 42 to surround an outer periphery of the rotor 42. The housing 44 supports the rotor 42 and the stator 43. The cooling fans 45 are provided on the rotor 42 to generate a cooling air when rotated integrally with the rotor 42. The brush device 46 is provided in the housing 44 to supply power to the rotor 42.

The rotor 42 includes a rotary shaft 47 and a rotor main body 48. The rotary shaft 47 is arranged on the axis of the rotor 42. The rotor main body 48 is provided to the rotary shaft 47 and housed in the housing 44. The rotor main body 48 includes a field coil 49 and a pole core 50. The field coil 49 generates a magnetic flux when supplied with power from the brush device 46. The pole core 50 is provided with the field coil 49, and a magnetic pole is formed thereto by the magnetic flux generated by the field coil 49.

The pole core 50 includes a pair of a first pole core section 71 and a second pole core section 72 that are engaged with each other. As illustrated in FIG. 8, the first pole core section 71 and the second pole core section 72 include claw-shaped magnetic poles 73 and 74, respectively. A permanent magnet 75 that is magnetized in a direction of reducing leakage of a magnetic flux between adjacent claw-shaped magnetic poles 73 and 74 is fixed to the adjacent claw-shaped magnetic poles 73 and 74.

The stator 43 is fixed in the housing 44. Further, the stator 43 includes a cylindrical stator core 51 and a plurality of stator coils 52. The stator core 51 surrounds the rotor main body 48. The plurality of stator coils 52 are provided onto the stator core 51, and generate an AC electromotive force when the magnetic flux generated from the field coil 49 changes along with the rotation of the rotor 42. Note that, although not illustrated, a rectifier for rectifying an AC current generated in the stator 43 into a DC current, a voltage regulator for regulating the magnitude of an AC voltage generated in the stator 43, and the like are provided in the housing 44.

The stator core 51 includes a magnetic member (such as iron). In this example, the stator core 51 includes a plurality of magnetic members stacked in the axial direction of the rotor 42. The stator core 51 includes an annular back yoke section 51a and a plurality of magnetic pole tooth sections 51b. The plurality of magnetic pole tooth sections 51b each protrude from the back yoke section 51a toward a radially inner side, and are arranged at intervals in a circumferential direction of the stator core 51. The magnetic pole tooth sections 51b are equiangularly arranged on the stator core 51.

The stator coils 52 are provided in the respective magnetic pole tooth sections 51b. Further, the plurality of stator coils 52 are arrayed in the circumferential direction of the stator core 51. In this example, each stator coil 52 is provided to straddle the plurality of magnetic pole tooth sections 51b, and hence the stator coils 52 adjacent in the circumferential direction are arranged to partially overlap each other in the radial direction. Each stator coil 52 includes a coil end 52a that protrudes from an end surface of the stator core 51 (axial end surface of the stator core 51) in the axial direction of the rotor 42.

An apex of each coil end 52a reaches a position on a radially outer side of the cooling fan 45. The coil ends 52a all have the same length (axial dimension of each coil end 52a). With this, the positions of the apexes of the coil ends 52a with respect to the axial end surface of the stator core 51 are all the same in the axial direction of the rotor 42. In other words, the stator coils 52 are arrayed in the circumferential direction of the stator core 51 in a state in which the apexes of the coil ends 52a are not shifted from one another in the axial direction of the rotor 42 (that is, in a state in which no step is formed between the apexes of the coil ends 52a in the axial direction of the rotor 42).

The housing 44 includes a front housing 53 and a rear housing 54, each of which is made of aluminum and formed into a substantially bowl shape. The front housing 53 and the rear housing 54 are fixed to each other by a plurality of bolts (not shown) in a state in which opening portions thereof are opposed to each other. Each of the front housing 53 and the rear housing 54 is opposed to the rotor 42 and the stator 43 in the axial direction of the rotor 42. In this example, each of the front housing 53 and the rear housing 54 is molded by sand casting, aluminum die-casting, or the like.

The rotary shaft 47 passes through the center of each of the front housing 53 and the rear housing 54. Further, the rotary shaft 47 is rotatably supported by each of the front housing 53 and the rear housing 54 through intermediation of a bearing 55.

The cooling fans 45 are fixed to both axial end surfaces of the rotor main body 48, respectively. Thus, the cooling fan 45 fixed to one end surface of the rotor main body 48 is covered by the front housing 53, and the cooling fan 45 fixed to the other end surface of the rotor main body 48 is covered by the rear housing 54. Further, the cooling fans 45 each include a plurality of blades 45a arranged at intervals in a rotational direction of the cooling fan 45. Each blade 45a is arranged at an outer peripheral portion of the cooling fan 45.

The brush device 46 includes a pair of slip rings 56 and a pair of brushes 57. The pair of slip rings 56 is fixed at a rear portion of the rotary shaft 47. The pair of brushes 57 is provided in the housing 44 and brought into contact with the corresponding slip ring 56 individually. When the rotary shaft 47 is rotating, each slip ring 56 rotates about the axis of the rotary shaft 47 while sliding on each brush 57.

The configuration of the front housing 53 is the same as the configuration of the front housing 13 according to the first embodiment. Further, the recess portion 27 opposed to the coil end 52a in the axial direction of the rotor 42 is formed in each rib 24 of the front housing 53. The configuration of the recess portion 27 is also the same as that according to the first embodiment.

A pulley 58 around which a transmission belt (not shown) for transmitting power is wound is fixed at an end portion of the rotary shaft 47 that protrudes from the front housing 53 to the outside of the housing 44. A terminal block 61 used for connection to an inverter circuit (not shown) is provided to the rear housing 54. The terminal block 61 is connected to a wiring board 62.

Next, a description is given of an operation of the generator-motor 41 when used as a generator. A current is supplied from a battery (not shown) to the field coil 49 via the brush 57 and the slip ring 56 to generate a magnetic flux. The claw-shaped magnetic pole 73 of the first pole core section 71 is magnetized to the N pole, and the claw-shaped magnetic pole 74 of the second pole core section 72 is magnetized to the S pole. On the other hand, the rotor 42 rotates when the pulley 58 is driven by an engine, and hence a rotating magnetic field is applied to the stator coil 52 to generate an electromotive force. This AC electromotive force passes through the rectifier to be rectified into a DC, and is charged in the battery after the magnitude thereof is regulated by the voltage regulator.

Next, a description is given of an operation of the generator-motor 41 when used as a motor. At the start of the engine, an AC current is supplied to the stator coil 52. Further, a field current is supplied to the field coil 49 via the brush 57 and the slip ring 56 to generate a magnetic flux. The claw-shaped magnetic pole 73 of the first pole core section 71 is magnetized to the N pole, and the claw-shaped magnetic pole 74 of the second pole core section 72 is magnetized to the S pole. Then, the stator coil 52 and the rotor main body 48 function as an electromagnet, and the rotor main body 48 rotates inside the stator 43 together with the rotary shaft 47. This rotating force of the rotary shaft 47 is transmitted to an output shaft of the engine via the pulley 58 to start the engine.

Even when the present invention is applied to such generator-motor 41, the same effects as those in the first embodiment can be obtained.

Note that, the recess portion 27 in each of the above-mentioned embodiments is formed only in the rib 24, but the present invention is not limited thereto. For example, the recess portion 27 formed in the rib 24 so as to be opposed to the coil end 12a in the axial direction of the rotor 2 may reach the intermediate frame portion 20.

Further, each exhaust port 26 in each of the above-mentioned embodiments is a slit-shaped hole that extends from a position on the radially outer side of the coil end 12a to reach a position closer to the rotary shaft 7 with respect to the coil end 12a. However, it is only necessary that at least a part of each exhaust port 26 be located on the position on the radially outer side of the coil end 12a. For example, each exhaust port 26 may be formed only at the position on the radially outer side of the coil end 12a.

In addition, the recess portion 27 in each of the above-mentioned embodiments is formed at the rib radial end 24b while avoiding a portion of the front housing 13 or 53 opposed to the blade 5a or 45a of the cooling fan 5 or 45. Alternatively, however, as long as the volume of the cooling air from the cooling fan 5 or 45 can be secured, a part of the recess portion 27 may reach the portion of the front housing 13 or 53 opposed to the blade 5a or 45a.

Description of Symbols 1 vehicle AC power generator (rotating electrical machine), 2, 42 rotor, 3, 43 stator, 4, 44 housing, 5, 45 cooling fan, 5a, 45a blade, 11, 51 stator core, 12, 52 stator coil, 12a, 52a coil end, 13, 53 front housing, 26 exhaust port, 27 recess portion, 41 vehicle generator-motor (rotating electrical machine)

The invention claimed is:

1. A rotating electrical machine, comprising:
a rotor to be rotated about its axis;
a stator comprising:
an annular stator core arranged on a radially outer side of the rotor; and
a plurality of stator coils provided onto the annular stator core and arrayed in a circumferential direction of the annular stator core;
a housing for supporting the rotor and the stator; and
a cooling fan including a blade, provided at an axial end portion of the rotor and covered by the housing, for generating a cooling air when rotated integrally with the rotor,
wherein each of the plurality of stator coils comprises a coil end that protrudes from an axial end surface of the annular stator core, and
wherein the housing comprises:
a recess portion formed on an inner surface of the housing opposed to the coil end in an axial direction, so that the inner surface of the housing opposed to the coil end is recessed from the inner surface of the housing opposed to the blade in the axial direction, and a clearance between the inner surface of the housing and the coil end is larger than a clearance between the inner surface of the housing and the blade; and
an exhaust port for passing the cooling air therethrough, at least part of the exhaust port being located at a position on a radially outer side of the coil end that is opposed to the recess portion, and the at least part of the exhaust port being located downstream of a flow path formed between the coil end and the recess portion,
wherein the housing further comprises: an annular outer frame portion, an annular intermediate frame portion, and a plurality of ribs that are connected between the outer frame portion and the intermediate frame portion, wherein the intermediate frame portion is a portion of the housing axially opposed to the blade,
the exhaust port is partitioned by the ribs, and
the ribs have a thickness in the entire axial direction small than a thickness in the axial direction of the intermediate frame portion due to the recess portion being formed on the inner surface of the housing.

2. The rotating electrical machine according to claim 1, wherein the recess portion is formed so as to avoid a portion of the housing opposed to the blade of the cooling fan.

3. The rotating electrical machine according to claim 2, wherein the coil ends all have the same length.

4. The rotating electrical machine according to claim 2, wherein the recess portion includes a coil end opposed surface and a recess portion side surface, wherein the recess portion side surface connects the coil end opposed surface to the portion of the housing opposed to the blade.

5. The rotating electrical machine according to claim 1, wherein the coil ends all have the same length.

6. The rotating electrical machine according to claim 1, wherein an inclined surface is formed on the inner surface of the housing, connecting the recess portion to the intermediate frame portion.

7. The rotating electrical machine according to claim 1, where a stepped surface is formed on the inner surface of the housing, connecting the recess portion to the intermediate frame portion.

8. The rotating electrical machine according to claim 1 wherein a curved surface is formed on the inner surface of the housing, connecting the recess portion to the intermediate frame portion.

* * * * *